United States Patent
Fromentoux et al.

(10) Patent No.: US 11,924,690 B2
(45) Date of Patent: Mar. 5, 2024

(54) METHOD FOR MANAGING TELECOMMUNICATIONS RESOURCES DYNAMICALLY ALLOCATED TO A PLURALITY OF TELECOMMUNICATIONS OPERATORS, COMPUTER PROGRAM PRODUCT AND CORRESPONDING DEVICES

(71) Applicant: Orange, Issy-les-Moulineaux (FR)

(72) Inventors: Gaël Fromentoux, Chatillon (FR); Tangui Le Gleau, Chatillon (FR); Xavier Marjou, Chatillon (FR); Benoît Radier, Chatillon (FR)

(73) Assignee: Orange

( * ) Notice: Subject to any disclaimer, the term of this patent is extended or adjusted under 35 U.S.C. 154(b) by 276 days.

(21) Appl. No.: 17/614,219

(22) PCT Filed: May 25, 2020

(86) PCT No.: PCT/EP2020/064458
§ 371 (c)(1),
(2) Date: Nov. 24, 2021

(87) PCT Pub. No.: WO2020/239704
PCT Pub. Date: Dec. 3, 2020

(65) Prior Publication Data
US 2022/0217585 A1    Jul. 7, 2022

(30) Foreign Application Priority Data

May 28, 2019  (FR) ...................................... 1905642

(51) Int. Cl.
*H04W 28/16*    (2009.01)
*H04W 4/50*    (2018.01)
(Continued)

(52) U.S. Cl.
CPC ............. *H04W 28/16* (2013.01); *H04W 4/50* (2018.02); *H04W 16/10* (2013.01); *H04W 72/30* (2023.01)

(58) Field of Classification Search
CPC ...................................................... H04W 28/16
See application file for complete search history.

(56) References Cited

U.S. PATENT DOCUMENTS

| | | | | |
|---|---|---|---|---|
| 5,836,008 A | * | 11/1998 | Goumillou | ................ H04L 9/40 |
| | | | | 370/467 |
| 2004/0139144 A1 | * | 7/2004 | Batra | .................... G06F 9/5072 |
| | | | | 709/200 |

(Continued)

FOREIGN PATENT DOCUMENTS

WO    WO 2018/004641 A1    1/2018

OTHER PUBLICATIONS

International Search Report for International application No. PCT/EP2020/064458, dated Jul. 10, 2020.

*Primary Examiner* — Hsinchun Liao
(74) *Attorney, Agent, or Firm* — Knobbe, Martens, Olson & Bear, LLP

(57) ABSTRACT

A method for managing telecommunications resources dynamically allocated to a plurality of telecommunications operators is disclosed. At least one module for centralized management of the resources carries out: receiving a request for resources emitted by a requesting module representing one of the plurality of telecommunications operators, referred to as a requesting operator, to the at least one module for centralized management of the resources; and sending, to the requesting module and in response to the request, at least one offer of resources. The at least one offer of resources comprises: a piece of common objective information, representing a resource management objective common to the plurality of telecommunications operators; and/or (Continued)

at least one piece of reliability information from at least one other of the plurality of telecommunications operators, referred to as an offering operator, proposing the at least one offer of resources.

17 Claims, 2 Drawing Sheets

(51) Int. Cl.
*H04W 16/10* (2009.01)
*H04W 72/30* (2023.01)

(56) References Cited

U.S. PATENT DOCUMENTS

| | | | |
|---|---|---|---|
| 2011/0009145 A1* | 1/2011 | Pirinen | H04W 16/14 455/509 |
| 2014/0357218 A1 | 12/2014 | Andrianov et al. | |
| 2016/0066192 A1* | 3/2016 | Markwart | H04W 16/10 455/454 |
| 2017/0353857 A1 | 12/2017 | Ojanen et al. | |

* cited by examiner

METHOD FOR MANAGING TELECOMMUNICATIONS RESOURCES DYNAMICALLY ALLOCATED TO A PLURALITY OF TELECOMMUNICATIONS OPERATORS, COMPUTER PROGRAM PRODUCT AND CORRESPONDING DEVICES

CROSS-REFERENCE TO RELATED APPLICATIONS

This application is filed under 35 U.S.C. § 371 as the U.S. National Phase of Application No. PCT/EP2020/064458 entitled "METHOD FOR MANAGING TELECOMMUNICATIONS RESOURCES DYNAMICALLY ALLOCATED TO A PLURALITY OF TELECOMMUNICATIONS OPERATORS, COMPUTER PROGRAM PRODUCT AND CORRESPONDING DEVICES" and filed May 25, 2020, and which claims priority to FR 1905642 filed May 28, 2019, each of which is incorporated by reference in its entirety.

BACKGROUND

Field

The field of the development is that of the implementation of telecommunications networks, for example a fixed-access, radio-mobile, fixed-access and radio-mobile convergent, etc. telecommunications network.

The development relates more particularly to the management of the resources (e.g., resources implemented in the local loop, radio resources, virtualised resources, etc.) in such telecommunications networks.

The development has numerous uses, in particular, but not exclusively, in the field of the telecommunications networks compliant with the latest-generation or future-generation 3GPP (for 3rd Generation Partnership Project) standards.

Description of the Related Technology

The sharing of telecommunications networks with roaming between operators has become a strategic issue for operators in order to reduce their network coverage costs especially in black spots, that is to say not covered by networks, and for which it can be costly for operators to deploy their specific infrastructures. In particular in the zones with low population density, most often an operator deploys a network, e.g. a mobile network, first and foremost to ensure connectivity for its clients, but also for clients of other operators not having deployed infrastructure in the geographic zone. An option alternative to this option involves deploying a telecommunications infrastructure shared by several operators, each operator financing a part of the infrastructure according to an agreement signed among the operators. According to the case, one or more parts of the mobile communication infrastructure can be shared. Thus, in certain cases, only the physical access infrastructure (pylons, antennas, buildings, etc.) is shared. In other cases the access network or the entire communication network is shared. This option of sharing networks remains rather difficult to implement because of the security and administration problems that this causes for the clients and the operators. In this context, the idea of a module (implemented in software or hardware form) common to several operators allowing each operator to dynamically propose and/or obtain telecommunications resources is put forward. For example, the TM Forum (formerly TeleManagement Forum) is working, in particular via the Catalyst project, on such a module and on the associated methods for managing the resources common to various operators according to a structure of the type of that shown in FIG. 1. More particularly, FIG. 1 shows a module 100 for centralised management of telecommunications resources that can be allocated dynamically to a first operator MNO-A and to a second operator MNO-B (here mobile operators). The first operator MNO-A interacts with the module 100 via a module 110A, the function of which is to represent the first operator MNO-A to the module 100 in question. Likewise, the second operator MNO-B interacts with the module 100 via a module 110B representing the second operator MNO-B to the module 100.

The module BSS-A implements the functionalities allowing to take charge of a range of telecommunications services by the first operator MNO-A. Likewise, the module BSS-B implements the functionalities allowing to take charge of a range of telecommunications services by the second operator MNO-B.

The function of intelligent management IM-A of the first operator MNO-A is in charge:

on the one hand of predicting the state (lack or overabundance) of the resources by observing the network infrastructure NETINF-A (such an infrastructure comprising for example one or more network nodes) and of communicating them to the module 110A. The resources in question are for example the capacity in a base station, or in the service to a local loop, or resources, called virtualised, implemented upstream of a network in order to implement virtualised functions, etc.;

on the other hand of applying the orders coming from the module 110A and of applying them to the network infrastructure NETINF-A.

Likewise, the function of intelligent management IM-B of the second operator MNO-B implements the same functionalities, i.e. on the one hand predicting the state (lack or overabundance) of the resources by observing the network infrastructure NETINF-B (such an infrastructure comprising for example one or more network nodes) and communicating them to the module 110B, and on the other hand applying the orders coming from the module 110B and applying them to the network infrastructure NETINF-B.

Thus, exchanges of resources between the operators MNO-A and MNO-B can occur dynamically via the module 100. The requests for resources as well as the offers of resources of each operator MNO-A, MNO-B are made to the module 100 by the corresponding modules 110A and 110B.

However, such modules and associated methods for managing the resources concentrate on the automation of the exchanges of resources between operators without addressing the accompanying issues related to the regulation of the exchanges in question.

There is therefore a need to overcome the shortfalls/disadvantages of the prior art, in particular in terms of regulation of the exchanges of telecommunications resources among operators desiring to obtain and/or offer such resources.

SUMMARY OF CERTAIN INVENTIVE ASPECTS

In one embodiment of the development, a method is proposed for managing telecommunications resources dynamically allocated to a plurality of telecommunications operators. According to such a method, at least one module for centralised management of the resources carries out the following steps:

receiving a request for resources emitted by a module, called requesting module, representing one of the plurality of telecommunications operators, called requesting operator, to said at least one module for centralised management of the resources;

sending, to the requesting module and in response to the request, at least one offer of resources.

Said at least one offer of resources comprises:

a piece of information, called piece of common objective information, representing a resource management objective common to the plurality of telecommunications operators; and/or at least one piece of reliability information from at least one other of the plurality of telecommunications operators, called offering operator, proposing said at least one offer of resources.

Thus, the development proposes a novel and inventive solution for dynamically managing telecommunications resources (e.g. the capacity in a base station, or in the service to a local loop, or virtualised resources moved upstream of a network in order to implement virtualised functions (e.g. CUs, Central Units, in the sense of the 3GPP, 3rd Generation Partnership Project)) in the context in which a plurality of operators (e.g. mobile and/or fixed) seek to obtain and/or offer such resources.

More particularly, according to the method proposed, the offers emitted by the module (software or hardware) for centralised management of the resources intended for the plurality of operators comprise information allowing to regulate the exchanges of resources among operators. For example, the piece of reliability information allows the requesting operator to form an opinion on the quality of the resources that the offering operator proposes. Likewise, the piece of common objective information allows to incite the requesting operator to accept offers of resources that are in line with the common objective. Thus, an overall behaviour of the various operators seeking to obtain and/or offer such resources that goes beyond their simple self-interest is obtained.

Alternatively, the module for centralised management of the resources can be distributed to each operator and the information recorded in the module in question can in this case also be certified by consensus by each operator as a certified distributed register.

According to one embodiment, said at least one module for centralised management of the resources further carries out a reception of said at least one offer of resources emitted by at least one module, called offering module, representing said at least one offering operator to said at least one module for centralised management of the resources.

Thus, the offering operator optimises the use of its resources when they are unused.

According to one embodiment, said at least one module for centralised management of the resources further carries out a reception of a piece of information emitted by the requesting module and representing a certified acceptance of an offer of resources out of said at least one offer of resources sent to the requesting module. The acceptance is certified by a consensus obtained on a set of results of moderating functions applied to the offer of resources. The moderating functions are associated with the various operators of the plurality of operators. For example, the acceptance is certified when the ratio between on the one hand the number of results of moderating functions representing an agreement with the fact that the offer is accepted by the operator having received it and on the other hand the total number of results of moderating functions is greater than a predetermined threshold (e.g. 50%, 66%, etc.). Thus, all of the operators seeking to obtain and/or offer the resources can verify that the acceptance of the offer by the requesting operator respects one or more previously defined rules. These can be for example regulatory constraints emitted by a regulatory body (e.g. for the radio coverage of a given geographic zone).

In one embodiment of the development, it is proposed that the requesting module carry out the following steps:

sending at least one request for resources to said at least one module for centralised management of the resources;

receiving at least one offer of resources emitted by said at least one module for centralised management of the resources in response to said at least one request.

Said at least one offer of resources comprises:

the piece of common objective information; and/or said at least one piece of reliability information from said at least one offering operator.

Thus, the piece of reliability information allows for example the requesting operator to form an opinion on the quality of the resources that the offering operator proposes. Likewise, the piece of common objective information allows to incite the requesting operator to accept offers of resources that are in line with the common objective. Thus, an overall behaviour of the various operators seeking to obtain and/or offer such resources that goes beyond their simple self-interest is obtained.

According to one embodiment, the requesting module further carries out a certified acceptance of an offer of resources out of said at least one offer of resources sent by said at least one module for centralised management of the resources. The offer of resources is accepted while taking into account the piece of common objective information and/or said at least one piece of reliability information. The acceptance is certified by a consensus obtained on a set of results of moderating functions applied to the offer of resources, the moderating functions being associated with the various operators of the plurality of operators.

For example, the acceptance is certified when the ratio between on the one hand the number of results of moderating functions representing an agreement with the fact that the offer is accepted by the operator having received it and on the other hand the total number of results of moderating functions is greater than a predetermined threshold (e.g. 50%, 66%, etc.). Thus, all of the operators seeking to obtain and/or offer the resources can verify that the acceptance of the offer by the requesting operator respects one or more previously defined rules. These can be for example regulatory constraints emitted by a regulatory body (e.g. for the radio coverage of a given geographic zone for a mobile operator).

According to one embodiment, the requesting module further carries out a sending, to said at least one module for centralised management of the resources, of a piece of information representing the acceptance in a certified manner of the offer of resources.

Thus, the certified transaction is recorded in a certified manner in the module(s) for centralised management of the resources.

According to one embodiment, the requesting module further carries out an update of the piece of reliability information relating to the offering operator having proposed the offer of resources accepted in a certified manner.

Thus, the requesting operator grades the offer made by the offering operator. For example, such a grade relates to the quality of the resources offered, if the transaction has indeed been carried out all the way to the end, etc. Such a grade is for example based on grades transmitted to the operator by clients that are users of terminals connected to the resources proposed by the offering operator (e.g. via SMS (Short Message Service) or USSD (Unstructured Supplementary Service Data) notifications, or by mechanisms of web services). The reverse mechanism can be provided in the module representing the offering operator which can thus grade the transaction accepted by the requesting operator.

According to one embodiment, the piece of common objective information is a function of a sum of pieces of information representing an individual management objective of the resources, called piece of individual objective information, of each operator of the plurality of telecommunications operators.

According to one embodiment, the piece of common objective information is a function of a piece of penalty information and the offer of resources is accepted while seeking to minimise the penalty in order to achieve the common objective.

For example the penalty is expressed as a sum of individual penalties corresponding to the implementation of a tit for tat criterion applied on the one hand to the resources accepted by the requesting operator and on the other hand to the resources offered by the same operator. Thus, an operator is incited to balance the exchanges of resources by offering as many resources (e.g. resources of a certain type) as it requests (e.g. resources of another type) in order for the piece of common objective information to represent an achieved common objective.

According to one embodiment, the requesting module carries out an update of the piece of individual objective information of the requesting operator after the acceptance in a certified manner of the offer of resources.

The development also relates to a computer program comprising program code instructions for the implementation of the method as described above, according to any one of its various embodiments, when it is executed on a computer.

In one embodiment of the development, a device is proposed for centralised management of telecommunications resources dynamically allocated to a plurality of telecommunications operators. Such a management device comprises a reprogrammable calculation machine or a dedicated calculation machine configured to implement the steps of the management method according to the development as carried out by the aforementioned module for centralised management of telecommunications resources (according to any one of the various aforementioned embodiments).

Thus, the features and advantages of this device are the same as those of the corresponding steps of the management method described above. Consequently, they are not described in more detail.

In one embodiment of the development, a device is proposed representing, to at least one module for centralised management of telecommunications resources dynamically allocated to a plurality of telecommunications operators, one of the plurality of telecommunications operators. Such a management device comprises a reprogrammable calculation machine or a dedicated calculation machine configured to implement the steps of the management method according to the development as carried out by the aforementioned module representing a telecommunications operator of the plurality of telecommunications operators (according to any one of the various aforementioned embodiments).

Thus, the features and advantages of this device are the same as those of the corresponding steps of the management method described above. Consequently, they are not described in more detail.

In one embodiment of the development, a node of a telecommunications network is proposed. Such a network node comprises at least one device out of the aforementioned devices (according to any one of the various aforementioned embodiments), i.e. a device for centralised management of telecommunications resources dynamically allocated to a plurality of telecommunications operators and a device representing, to at least one module for centralised management of telecommunications resources dynamically allocated to a plurality of telecommunications operators, one of the plurality of telecommunications operators.

BRIEF DESCRIPTION OF THE DRAWINGS

Other objectives, features and advantages of the development will appear more clearly upon reading the following description, given as a simple illustrative example, and non-limiting, in relation to the drawings, among which.

DETAILED DESCRIPTION OF CERTAIN ILLUSTRATIVE EMBODIMENTS

The general principle of the development is based on the use of one or more pieces of information accompanying the offers of resources emitted by a module for centralised management of telecommunications resources to the various operators seeking to obtain and/or offer resources via the module for centralised management in question. More particularly, an offer of resources emitted according to the technique described comprises a piece of information, called piece of common objective information, representing a resource management objective common to all of the various operators seeking to obtain and/or offer resources via the module for centralised management of the resources, and/or a piece of reliability information from the telecommunications operator proposing the offer of resources in question. Thus, an overall behaviour of the various operators seeking to obtain and/or offer resources via the module for centralised management that goes beyond their simple self-interest is obtained.

In the present application, it is noted in general that the term module can correspond both to a software component and to a hardware component or a set of software and hardware components. A software component itself corresponds to one or more computer programs or subprograms or more generally to any element of a program capable of implementing a function or a set of functions as described for the module(s) in question. Likewise, a hardware component corresponds to any element of a hardware assembly capable of implementing a function or a set of functions for the module(s) in question (integrated circuit, chip card, memory card, etc.). In this case, the hardware component is in the form of a device configured to implement a function or a set of functions as described for the module(s) in question.

Figure 1:
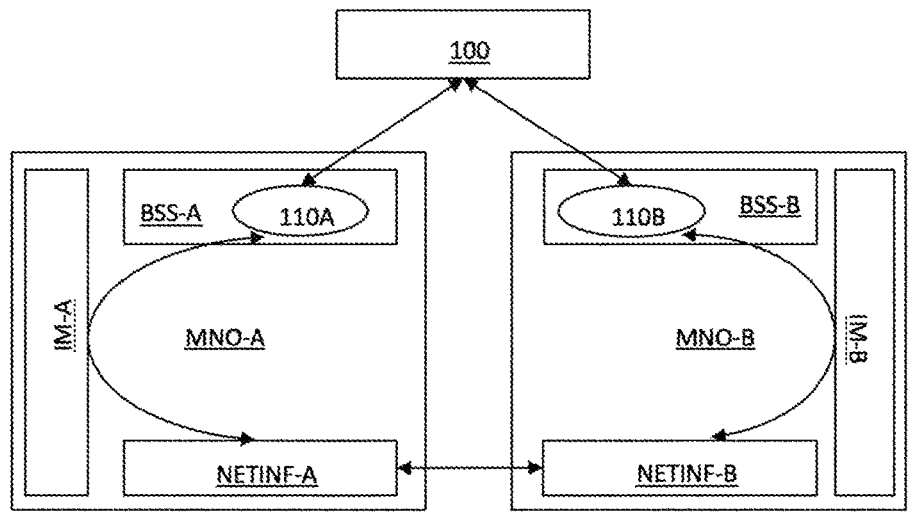
FIG. 1, already discussed above in the section "Prior art and its disadvantages", shows various modules allowing several operators to dynamically propose and/or obtain telecommunications resources according to a known technique.
Figure 2:
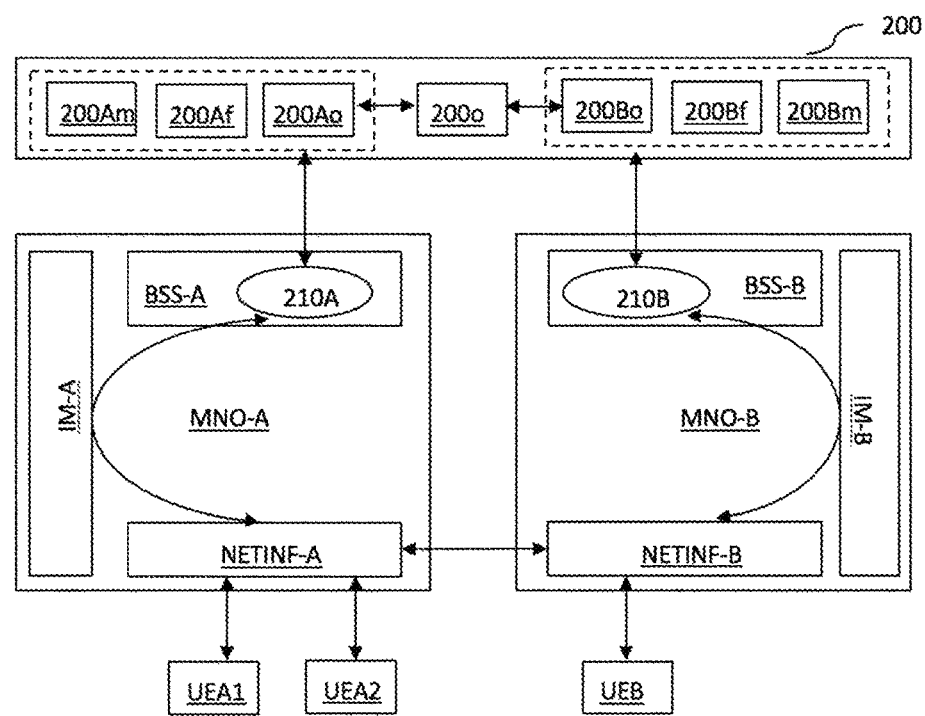
FIG. 2 shows various modules allowing several operators to dynamically propose and/or obtain telecommunications resources according to an embodiment of the development.

Now, in relation to FIG. 2, a shared module 200 for centralised management of the telecommunications resources dynamically allocated to a first operator MNO-A and to a second operator MNO-B, as well as modules 210A and 210B representing the operators MNO-A and MNO-B to the module 200, are presented. Such modules 200, 210A and 210B allow in particular the operators MNO-A and MNO-B to dynamically propose and/or obtain telecommunications resources according to an embodiment of the development. More particularly, the telecommunications operators MNO-A and MNO-B here are mobile operators. Two user terminals UEA1 and UEA2 are clients of the operator MNO-A and use the connectivity resources that are allocated to the operator MNO-A. A terminal UEB is a client of the operator MNO-B and uses the connectivity resources that are allocated to the operator MNO-B.

In other embodiments, all or a part of the operators dynamically proposing and/or obtaining telecommunications resources from the module 200 are fixed operators, fixed-mobile convergent operators, Wi-Fi hotspot operators, enterprise network operators, local network operators, or any other type of operator using telecommunications resources. In other embodiments, the module 200 manages the resources for more than two operators.

Returning to FIG. 2, the module 200 integrates new functionalities with respect to the known module 100. More particularly, the module 200 integrates at least three modules for each operator. With regard to the operator MNO-A, the following are associated with it:
- a module 200Am implementing a moderating function regulating the exchanges of resources according to one or more predefined moderation rules (e.g. rules coming from regulatory constraints emitted by a regulatory body);
- a module 200Af storing a piece of reliability information associated with the operator MNO-A; and
- a module 200Ao storing a piece of individual objective information, i.e. associated with the operator MNO-A, for management of the telecommunications resources.

These various functionalities are described in more detail below in relation to FIG. 3. Moreover, the module 200 integrates the same functionalities associated with the operator MNO-B via corresponding modules 200Bm, 200Bf and 200Bo. The module 200 also integrates a module 200o storing a piece of common objective information, i.e. representing a resource management objective common to the operators MNO-A and MNO-B.

Each of the various aforementioned modules, i.e. 200, 210A, 200Am, 200Af, 200Ao, 210B, 200Bm, 200Bf, 200Bo and 200o is shown here as a single entity. However, in other embodiments, all or part of the modules in question are implemented in a distributed manner, for example via a technology of the DLT (for Distributed Ledger Technology) type. In other embodiments, a single module (implemented in a distributed manner or not) implements both a subset or all of the functionalities of the aforementioned modules, i.e. 200, 210A, 200Am, 200Af, 200Ao, 210B, 200Bm, 200Bf, 200Bo and 200o.

The modules 200Ao and 200Af associated with the operator MNO-A and the modules 200Bo and 200Bf associated with the operator MNO-B record individual information (i.e. associated with the corresponding operators MNO-A and MNO-B) that can then be aggregated anonymously to deduce therefrom a piece of shared information, e.g. to obtain a common objective and/or a shared reliability index as described below in relation to FIG. 3.

Figure 3:
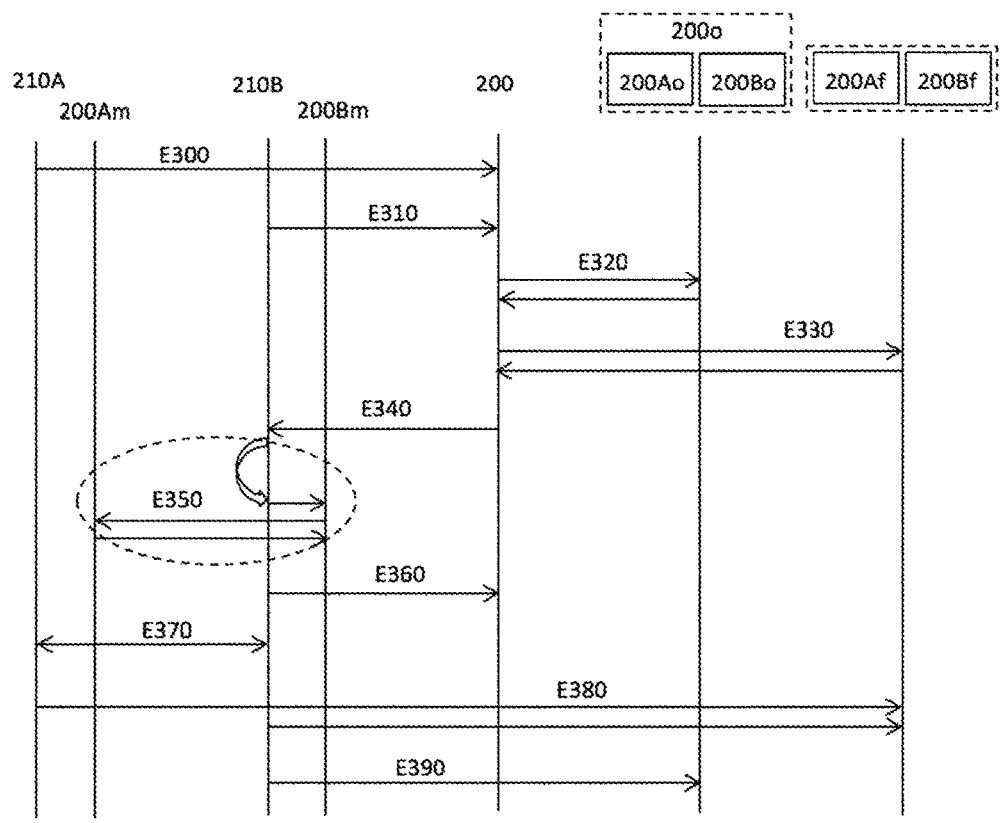
FIG. 3 shows the steps of a method for managing the resources implemented by the various modules of FIG. 2 according to an embodiment of the development.

Now, in relation to FIG. 3, the steps of a method for managing the resources implemented by the modules of FIG. 2 according to an embodiment of the development are now presented.

During a step E300, the module 200 receives an offer of resources emitted by the module 210A on behalf of the operator MNO-A. For example, the offer made by the operator MNO-A is characterised by the identifier of the offer, a date of beginning of availability of the resources, a date of end of availability of the resources, a volume of resources offered, a location and the identifier of the module 210A. Thus, the operator MNO-A behaves like an operator offering resources that are available, that is to say not used for its own clients or not made available to another operator for the period in question. Thus, the operator MNO-A optimises the use of its resources by proposing them to other operators. Such an offer is for example certified and recorded in the module 200.

During a step E310, the module 200 receives a request for resources emitted by the module 210B on behalf of the operator MNO-B. For example, the request made by the operator MNO-B is related to a temporary need for connectivity resources. Such a request is for example characterised by an identifier, a date of beginning of the need for resources, a duration of use of the resources, a volume of resources, a location and the identifier of the module 210B. Such a request is for example certified and recorded in the module 200.

During a step E320, the module 200 requests and receives from the module 200o the piece of common objective information. Such a piece of information represents a resource management objective common to the operators MNO-A and MNO-B. This involves for example setting an objective allowing to maximise the participation of the modules 210A and 210B of the operators MNO-A and MNO-B (e.g. the number of offers of resources or of requests for resources made), or to make the modules in question cooperate.

For example, the piece of common objective information is calculated on the basis of a single formula set by consensus by all of the operators MNO-A and MNO-B working with the module 200 via the modules 210A and 210B. In alternatives, the piece of common objective information is a function of a sum of pieces of information representing an individual objective of management of the resources, called piece of individual objective information, of each operator MNO-A and MNO-B. In other words the piece of common objective information is a function of $\Sigma_i I_i$, with $I_i$ being the piece of individual objective information of the operator having the index i out of the set of operators MNO-A and MNO-B. Such a piece of individual objective information is for example representative of an objective for radio coverage over a given geographic zone, or representative of a quality-of-service objective, or representative of an objective for guaranteed minimum bitrate or capacity over a given time period, etc.

In alternatives, the piece of common objective information is also a function of a piece of penalty information that the requesting module 210B seeks to minimise in order to achieve the common objective (e.g. when it decides or not to accept the offer made by the module 210A according to the mechanism described below in relation to step E350). For example, the penalty P is expressed as the sum of individual penalties each associated with the transactions carried out by the corresponding operator MNO-A or MNO-B. In other words, $P=\Sigma_i P_i$, with $P_i$ being the individual penalty of the operator having the index i out of the set of operators MNO-A and MNO-B.

For example the individual penalty $P_i$ corresponds to the implementation of a tit for tat criterion applied on the one hand to the resources accepted by the operator having the index i and on the other hand to the resources previously offered by the same operator. Thus, an operator is incited to balance the exchanges of resources by offering as many resources as it requests. For example:

$$P_i = \left| \log\left(\frac{nbr \text{ of offers of the operator having the index } i \text{ accepted}}{nbr \text{ of offers accepted by the operator having the index } i}\right) \right|$$

In these alternatives, the piece of common objective information is for example proportional to:

$$\sum_i I_i - \alpha P$$

with $\alpha$ being a coefficient associated with the importance given to the penalty P. Thus, each operator MNO-A, MNO-B is incited to balance the exchanges of resources by offering as many resources (e.g. resources of a certain type) as it requests (e.g. resources of another type) in order to minimise the penalty P. The common objective is thus achieved.

In certain embodiments, the module 200 only processes the offers and/or requests for resources for operators for which the piece of individual objective information $P_i$ is between predetermined thresholds.

During a step E330, the module 200 requests and receives from the module 200f a piece of reliability information from the operator MNO-A proposing the offer of resources.

Such a piece of reliability information comes for example from a grading by the other operators already having carried out a transaction with the operator MNO-A as described below in relation to step E380. In other embodiments, the piece of reliability information corresponds to a quality of experience index identified by the users of the operators MNO-A and MNO-B (e.g. over a geographic zone), or to an index of quality of service over a given time period (example measurement of quality of the networks recovered by measurement tools of the type "mon réseau" or "Ookla speedtest").

During a step E340, the module 200 sends to the module 210B, in response to the request received during the step E310, an offer of resources corresponding here to the offer emitted by the module 210A and received by the module 200 during the step E300.

In other embodiments, the module 200 sends several offers of resources to the module 210B in response to the request received during the step E310. This is for example the case when the operator MNO-A makes several offers (e.g. each relating to resources of different natures), or in embodiments in which more than two operators make offers of resources to the module 200, etc.

Returning to FIG. 3, the offer of resources sent by the module 200 to the module 210B comprises the piece of common objective information received during the step E320 and the piece of reliability information received during the step E330. Thus, the piece of reliability information allows the requesting operator MNO-B to form an opinion on the quality of the resources that the offering operator MNO-A proposes. Likewise, the piece of common objective information allows to incite the requesting operator MNO-B to accept offers of resources that are in line with the common objective. As described above in relation to FIG. 2, the calculation of the common objective involves information provided by all of the operators MNO-A and MNO-B to the module 200 via the modules 210A and 210B. Thus, an overall behaviour of the various operators MNO-A and MNO-B seeking to obtain and/or offer such resources that goes beyond their simple self-interest is obtained.

In certain embodiments, the step E320 or the step E330 is not implemented and the offer of resources sent by the module 200 to the module 210B of the requesting operator MNO-B only comprises one piece of information out of the piece of common objective information and the piece of reliability information. When only the piece of reliability information is sent with the offer of resources, the piece of common objective information can be sent secondarily in addition to the offer of resources.

Returning to FIG. 3, during a step E350, the module 210B of the requesting operator MNO-B accepts the offer received while taking into account the piece of common objective information and/or the piece of reliability information accompanying the offer.

In other embodiments in which the module 200 sends several offers of resources to the module 210B in response to the request received during the step E310, the module 210B accepts one (or more) offers received while taking into account the piece of common objective information (e.g. while seeking to minimise the penalty P as described above in relation to step E320) and/or the piece of reliability information accompanying the corresponding offer.

In other embodiments, the offer is accepted while taking into account other criteria specific to the operator MNO-B (e.g. its individual objective of management of the resources).

Returning to FIG. 3, the acceptance of the offer of resources is certified via a consensus obtained on a set of results of moderating functions applied to the offer of resources received during step E340. The moderating functions are implemented in the modules 200Am and 200Bm respectively associated with the operators MNO-A and MNO-B. The chain that forms the moderating functions is initialised by the module 200Bm, loops over all the moderating functions and terminates once again on the module 200Bm.

As described above in relation to FIG. 2, the modules 200Ao or 200Af, as well as 200Bo or 200Bf, are each represented here as a single entity. However, in other embodiments, all or a part of the modules in question are implemented in a distributed manner, for example via a technology of the DLT type. In other embodiments, a single module (implemented in a distributed manner or not) simultaneously implements a subset or all of the functionalities of the modules in question.

For example, it is decided that a consensus is obtained when the ratio between, on the one hand, the number of results of moderating functions that represents an agreement with the fact that the offer is accepted by the operator having received it and, on the other hand, the total number of results of moderating functions is greater than a predetermined threshold (e.g. 50%, 66%, etc.). Thus, all of the operators seeking to obtain and/or offer the resources can verify that the acceptance of the offer by the requesting operator MNO-B respects one or more previously defined rules.

More particularly, a moderating function can take into account one (or more) predetermined rules (e.g. regulatory constraints emitted by a regulatory body) as well as external data (e.g. for cellular operators, the public data on location of the antennas, the data on densifications of population for a given geographic zone, etc.) in order to evaluate an offer of resources made to a given operator. For example, on the basis of such data, the moderating functions can:

- identify whether the resource offered in a given cell allows to increase the coverage or the capacity (co-sited cell or not). The location of the cell allows to know the density of people in the zone covered by the cell. This allows to estimate the rate of coverage of the territory as well as the rate of coverage of the population. This result can also be used by an external regulator to validate the respect of the regulations in terms of coverage. Indeed, via the dynamic allocation of the resources carried out via the module 200, the rate of coverage of an operator MNO-A or MNO-B may vary continually over time, which can lead to difficulties in knowing whether the operators MNO-A and MNO-B respect the regulatory constraints over time;
- identify the weight of each transaction between the operators MNO-A and MNO-B with a weighting that varies over time. For example, the greater the weight given to a transaction, the more the constraints observed by the moderating functions must be respected. Thus, the first transactions have for example a zero weight to incite the operators MNO-A and MNO-B to exchange resources. The weight can then vary according to certain criteria for example such as:
- an operator MNO-A or MNO-B provides only resources and loses resource capacities not allowing it to respect given regulatory constraints. The weight of its transactions thus increases;
- an operator MNO-A or MNO-B shares resources with other operators, which allows to increase the capacity of each operator and allows to reduce the electricity consumption of the infrastructures. The weight of its transactions thus decreases;
- an operator MNO-A or MNO-B requests resources and as soon as it reaches the minimum coverage threshold, the weight of its transactions is increased to incite it to continue to invest in its network; and
- cancel an offer if it does not respect the rules of the moderating functions when it has reached a certain weight.

During a step E360, the module 210B of the requesting operator MNO-B sends to the module 200 a piece of information representing the acceptance in a certified manner of the offer of resources received during the step E340. Thus, the certified transaction (i.e. the offer accepted in a certified manner) is recorded in a certified manner in the module 200.

During a step E370, the resources are exchanged between the operators MNO-A and MNO-B. For example the terminal UEB, a client of the operator MNO-B, is temporarily attached to a base station managed by the operator MNO-A. To do this, a technique as described in the application FR1763063 is for example implemented in order for the operator MNO-B to access the resources offered by the operator MNO-A.

Returning to FIG. 3, during a step E380, each of the operators MNO-A and MNO-B is invited via the corresponding module 210A or 210B to grade the reliability of the other operator in order to update the piece of reliability information from the other operator.

For example, the operator MNO-B bases its grade on the fact that the resources were indeed made available or not. On its part, the operator MNO-A bases its grade for example on the fact that the operator MNO-B effectively made a payment in exchange for the resources obtained. According to other examples, the operator MNO-B bases its grade on the quality of the resources offered. More particularly, grades are transmitted to the operator MNO-B by clients that are users of terminals connected to the resources proposed by the offering operator (e.g. via SMS (Short Message Service) or USSD (Unstructured Supplementary Service Data) notifications or via campaigns of tests (e.g. Minimizing drive tests 3GPP TS 37.320), or by the measurement tools in the terminals of the type "mon réseau" or "Ookla speedtest", or by mechanisms of web services). A homogenisation of the grades can also be carried out (average adjustment for example) to overcome the problem of the clients that are more demanding than others. This homogenisation can also be continued in a cell between operators in order to estimate whether the cell is of interest.

Returning to FIG. 3, during a step E390, the requesting module 210B carries out an update of the piece of individual objective information of the requesting operator MNO-B after the acceptance in a certified manner of the offer of resources.

Thus, the piece of common objective information can also be updated by the module 200 on the basis of the piece of individual objective information of the operator MNO-B updated according to the mechanisms described above in relation to step E320.

Figure 4:
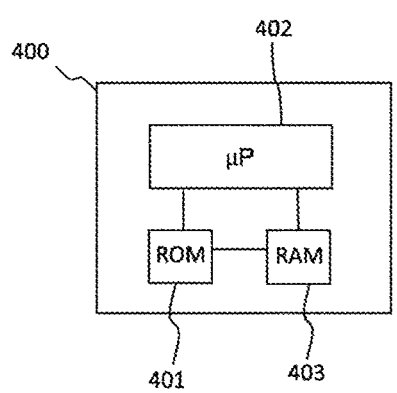
FIG. 4 shows an example of a structure of a device allowing the implementation of the steps of the management method of FIG. 3 according to an embodiment of the development.

Now, in relation to FIG. 4, an example of a structure of a device 400 allowing to implement the steps of the method for managing the resources of FIG. 3 according to an embodiment of the development is presented.

The device 400 comprises a random-access memory 403 (for example a RAM memory), a processing unit 402 equipped for example with a processor, and controlled by a computer program stored in a read-only memory 401 (for example a ROM memory or a hard disk). Upon initialisation, the code instructions of the computer program are for example loaded into the random-access memory 403 before being executed by the processor of the processing unit 402. This FIG. 4 only illustrates a particular manner, among several possible, of carrying out the device 400 in order for it to carry out certain steps of the management method according to the development (according to any one of the embodiments and/or alternatives described above in relation to FIG. 3). Indeed, these steps can be carried out indifferently on a reprogrammable calculation machine (a PC computer, a DSP processor or a microcontroller) executing a program containing a sequence of instructions, or on a dedicated calculation machine (for example a set of logic gates such as an FPGA or an ASIC, or any other hardware module).

In the case in which the device 400 is carried out with a reprogrammable calculation machine, the corresponding program (that is to say the sequence of instructions) can be stored in a storage medium that is removable (for example such as a diskette, a CD-ROM or a DVD-ROM) or not, this storage medium being partly or totally readable by a computer or a processor.

In certain embodiments, the device 400 implements any one of the modules 200, 210A, 200Am, 200Af, 200Ao, 210B, 200Bm, 200Bf, 200Bo and 200o.

In certain embodiments, the device 400 implements several or the totality of the modules 200, 210A, 200Am, 200Af, 200Ao, 210B, 200Bm, 200Bf, 200Bo and 200o.

In certain embodiments, the device 400 is included in a network node.

The invention claimed is:

1. A method of managing telecommunications resources dynamically allocated to a plurality of telecommunications operators,
  wherein at least one module for centralized management of the resources carries out:
  receiving a request for resources emitted by a requesting module, representing one telecommunications operator of the plurality of telecommunications operators, referred to as a requesting operator, to the at least one module for centralized management of the resources; and
  sending, to the requesting module and in response to the request, at least one offer of resources,
  wherein the at least one offer of resources comprises:
  a piece of common objective information representing a resource management objective common to the plurality of telecommunications operators; and/or
  at least one piece of reliability information from at least one other of the plurality of telecommunications operators, referred to as an offering operator, proposing the at least one offer of resources.

2. The method according to claim 1, wherein the at least one module for centralized management of the resources further carries out a reception of the at least one offer of resources emitted by at least one offering module representing the at least one offering operator to the at least one module for centralized management of the resources.

3. The method according to claim 1, wherein the at least one module for centralized management of the resources further carries out a reception of a piece of information emitted by the requesting module and representative of a certified acceptance of an offer of resources out of the at least one offer of resources sent to the requesting module,
  the acceptance being certified by a consensus obtained on a set of results of moderating functions applied to the offer of resources, the moderating functions being associated with the various operators of the plurality of operators.

4. A non-transitory computer storage medium, storing instructions of a computer program, causing implementing of the method according to claim 1, when the program is executed on a computer.

5. The method according to claim 1, wherein the piece of common objective information is a function of a sum of pieces of information representing an individual objective of management of the resources, referred to as a piece of individual objective information, of each operator of the plurality of telecommunications operators.

6. A method of managing telecommunications resources dynamically allocated to a plurality of telecommunications operators,
  wherein a requesting module representing one telecommunications operator of the plurality of telecommunications operators, referred to as a requesting operator, to at least one module for centralized management of the resources, carries out the following steps:
  sending at least one request for resources to the at least one module for centralized management of the resources; and
  receiving at least one offer of resources emitted by the at least one module for centralized management of the resources in response to the at least one request,
  wherein the at least one offer of resources comprises:
  a piece of common objective information, representing a management objective of the resources that is common to telecommunications operators; and/or
  at least one piece of reliability information from at least one other of the plurality of telecommunications operators, referred to as an offering operator, proposing the at least one offer of resources.

7. The method according to claim 6, wherein the requesting module further carries out a certified acceptance of an offer of resources out of the at least one offer of resources sent by the at least one module for centralized management of the resources, the offer of resources being accepted while taking into account the piece of common objective information on the common objective and/or the at least one piece of reliability information,
  the acceptance being certified by a consensus obtained on a set of results of moderating functions applied to the offer of resources, the moderating functions being associated with the various operators of the plurality of operators.

8. The method according to claim 7, wherein the requesting module further carries out a sending, to the at least one module for centralized management of the resources, of a piece of information representing the acceptance in a certified manner of the offer of resources.

9. The method according to claim 7, wherein the requesting module further carries out an update of the piece of reliability information relating to the offering operator having proposed the offer of resources accepted in a certified manner.

10. The method according to claim 6, wherein the piece of common objective information is a function of a sum of pieces of information representing an individual objective of management of the resources, referred to as a piece of individual objective information, of each operator of the plurality of telecommunications operators.

11. The method according to claim 10,
  wherein the requesting module further carries out a certified acceptance of an offer of resources out of the at least one offer of resources sent by the at least one module for centralized management of the resources, the offer of resources being accepted while taking into account the piece of common objective information on the common objective and/or the at least one piece of reliability information,
  the acceptance being certified by a consensus obtained on a set of results of moderating functions applied to the offer of resources, the moderating functions being associated with the various operators of the plurality of operators,
  wherein the piece of common objective information is a function of a piece of penalty information, the offer of resources being accepted while seeking to minimize the penalty in order to achieve the common objective.

12. The method according to claim 10,
  wherein the requesting module further carries out a certified acceptance of an offer of resources out of the at least one offer of resources sent by the at least one module for centralized management of the resources, the offer of resources being accepted while taking into account the piece of common objective information on the common objective and/or the at least one piece of reliability information, the acceptance being certified by a consensus obtained on a set of results of moderating functions applied to the offer of resources, the moderating functions being associated with the various operators of the plurality of operators, wherein the requesting module carries out an update of the piece of individual objective information of the requesting operator after the acceptance in a certified manner of the offer of resources.

13. A non-transitory computer storage medium, storing instructions of a computer program, causing implementing of the method according to claim 6, when the program is executed on a computer.

14. A device for centralized management of telecommunications resources dynamically allocated to a plurality of telecommunications operators, comprising a reprogrammable calculation machine or a dedicated calculation machine, the device configured to:
   receive a request for resources emitted by a requesting module representing one of the plurality of telecommunications operators, called referred to as a requesting operator, to the at least one module for centralized management of the resources; and
   send, to the requesting module and in response to the request, at least one offer of resources,
   wherein the at least one offer of resources comprises:
   a piece of common objective information, representing a management objective of the resources that is common to telecommunications operators; and/or
   at least one piece of reliability information from at least one other of the plurality of telecommunications operators, referred to as an offering operator, proposing the at least one offer of resources.

15. A node of a telecommunications network, wherein it the node comprises at least one device according to claim 14.

16. A device for representing, to at least one module for centralized management of telecommunications resources dynamically allocated to a plurality of telecommunications operators, one of the plurality of telecommunications operators, referred to as a requesting operator, comprising a reprogrammable calculation machine or a dedicated calculation machine, the device configured to:
   send at least one request for resources to the at least one module for centralized management of the resources; and
   receive at least one offer of resources emitted by the at least one module for centralized management of the resources in response to the at least one request,
   wherein the at least one offer of resources comprises:
   a piece of common objective information, representing a management objective of the resources that is common to telecommunications operators; and/or
   at least one piece of reliability information from at least one other of the plurality of telecommunications operators, referred to as an offering operator, proposing the at least one offer of resources.

17. A node of a telecommunications network, wherein the node comprises at least one device according to claim 16.

* * * * *